United States Patent
Zhang

(10) Patent No.: US 9,313,443 B2
(45) Date of Patent: Apr. 12, 2016

(54) TELEVISION AND METHOD AND DEVICE FOR IDENTIFYING AND DISPLAYING CC MODE OF TELEVISION

(71) Applicant: SHENZHEN TCL NEW TECHNOLOGY CO., LTD., Shenzhen, Guangdong (CN)

(72) Inventor: Rui Zhang, Shenzhen (CN)

(73) Assignee: SHENZHEN TCL NEW TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/416,644

(22) PCT Filed: Sep. 4, 2013

(86) PCT No.: PCT/CN2013/082939
§ 371 (c)(1),
(2) Date: Jan. 23, 2015

(87) PCT Pub. No.: WO2014/079259
PCT Pub. Date: May 30, 2014

(65) Prior Publication Data
US 2015/0189217 A1    Jul. 2, 2015

(30) Foreign Application Priority Data
Nov. 26, 2012    (CN) .......................... 2012 1 0487023

(51) Int. Cl.
| H04N 5/445 | (2011.01) |
| H04N 21/435 | (2011.01) |
| H04N 21/441 | (2011.01) |
| H04N 21/485 | (2011.01) |
| H04N 21/488 | (2011.01) |

(52) U.S. Cl.
CPC ....... *H04N 5/44513* (2013.01); *H04N 5/44582* (2013.01); *H04N 21/435* (2013.01); *H04N21/441* (2013.01); *H04N 21/4856* (2013.01); *H04N 21/4884* (2013.01); *H04N 2005/44526* (2013.01)

(58) Field of Classification Search
CPC . H04N 5/44513; H04N 5/4401; H04N 5/445; H04N 5/44543; H04N 5/44582; H04N 2005/44526; H04N 21/435; H04N 21/441; H04N 21/4856; H04N 21/4884
USPC ................. 348/465, 468, 473, 460, 461, 552, 348/563–565, 705, 478
See application file for complete search history.

(56) References Cited

U.S. PATENT DOCUMENTS

| 2004/0036806 A1* | 2/2004 | Katayama | ............ H04N 5/4401 348/563 |
| 2008/0158421 A1* | 7/2008 | Adachi | .............. H04N 5/44543 348/554 |
| 2010/0188572 A1* | 7/2010 | Card, II | .................. H04N 5/445 348/468 |
| 2011/0102673 A1* | 5/2011 | Schultz | .............. H04N 5/44513 348/468 |
| 2011/0141358 A1* | 6/2011 | Hardacker | ......... H04N 5/44513 348/563 |

FOREIGN PATENT DOCUMENTS

CN    1897652 A    1/2007

OTHER PUBLICATIONS

International Search Report of PCT Patent Application No. PCT/CN2013/082939 issued on Dec. 12, 2013.

* cited by examiner

*Primary Examiner* — Trang U Tran

(57) ABSTRACT

The present disclosure provides a method and a device for identifying and displaying a CC mode of a television. The method includes: decoding received CC program signals to obtain decoding information; obtaining a CC mode corresponding to the CC program signals according to the decoding information; and performing corresponding display according to a preset rule based on the obtained CC mode. Compared with the existed technology, the embodiment of the present disclosure decodes the CC program signals, identifies the corresponding CC mode according to the decoding information, and displays the CC contents according to the identified CC mode, which simplifies the choosing of the mode and thus is convenient for the user.

12 Claims, 3 Drawing Sheets

TELEVISION AND METHOD AND DEVICE FOR IDENTIFYING AND DISPLAYING CC MODE OF TELEVISION

BACKGROUND

1. Technical Field

The present disclosure relates to televisions, and particularly, to a television and a method and a device for identifying and displaying CC (Closed Caption) modes of the television.

2. Description of Related Art

Televisions sold in North America or Latin America or other areas are required to support CC (Closed Caption) functions. Closed captions refer to hidden interpretative captions which are designed for audiences having hearing problems or watching the programs in muting conditions. The closed captions describe events in a television screen via some interpretative languages in muting conditions, for example, when background sounds appear in an image, the captions occur to provide indications. The indicative captions are called CC contents.

At present, there are eight types of CC modes for televisions, including CC1, CC2, CC3, CC4, TX1, TX2, TX3, and TX4. When a user wants to watch a CC program, a corresponding CC mode needs to be chosen. However, the user may not clearly know which type of CC signal is carried in the CC program; thus, the user may need to select the modes in turn by manual to finally obtain the mode corresponding to the CC signal to display the CC contents. Moreover, some CC programs may not have CC contents, or the CC modes corresponding to different CC programs are different, making it troublesome for the user the use the television.

SUMMARY

The main purpose of the invention is to provide a method and a device for identifying and displaying a CC mode of a television, which aims to automatically match the corresponding CC mode when a user is watching a CC program and thus is convenient for the user to use the television.

A method for identifying and displaying a CC mode of a television is provided, including:

decoding received CC program signals to obtain decoding information;

obtaining a CC mode corresponding to the CC program signals according to the decoding information; and performing corresponding display according to a preset rule based on the obtained CC mode.

Preferably, obtaining a CC mode corresponding to the CC program signals according to the decoding information includes:

analyzing and obtaining the CC mode corresponding to the CC program signals according to a field identification bit, a channel identification bit, and a service type identification bit in the decoding information.

Preferably, the preset rule includes corresponding displaying rule when one or multiple types of CC modes are obtained; and performing corresponding display according to a preset rule based on the obtained CC mode includes:

when one type of CC mode is obtained, generating and displaying indicating information including the CC mode corresponding to the CC program signals, and displaying CC contents when a CC mode function control switch in a television menu is detected being open;

when multiple types of CC modes are obtained, generating and displaying indicating information including the CC modes corresponding to the CC program signals, and displaying CC contents corresponding to the CC mode having the highest priority according to a priority order of the CC modes when a CC mode function control switch in a television menu is detected being open.

Preferably, the indicating information is displayed by icons or menus.

Preferably, the method further includes the following step after performing corresponding display according to a preset rule based on the obtained CC mode:

receiving a CC mode switching command and displaying the CC contents after determining that the switched CC mode is the one corresponding to the CC program signals.

The present disclosure further provides a device for identifying and displaying a CC mode of a television, includes:

a decoding module, configured to decode received CC program signals to obtain decoding information;

an analyzing module, configured to obtain a CC mode corresponding to the CC program signals according to the decoding information; and a displaying module, configured to perform corresponding display according to a preset rule based on the obtained CC mode.

Preferably, the analyzing module is configured to analyze and obtain the CC mode corresponding to the CC program signals according to a field identification bit, a channel identification bit, and a service type identification bit in the decoding information.

Preferably, the preset rule includes corresponding displaying rule when one or multiple types of CC modes are obtained; and the displaying module is configured to:

when one type of CC mode is obtained, generate and display indicating information including the CC mode corresponding to the CC program signals, and display CC contents when a CC mode function control switch in a television menu is detected being open;

when multiple types of CC modes are obtained, generate and display indicating information including the CC modes corresponding to the CC program signals, and display CC contents corresponding to the CC mode having the highest priority according to a priority order of the CC modes when a CC mode function control switch in a television menu is detected being open.

Preferably, the indicating information is displayed by icons or menus.

Preferably, the device further includes a CC mode switching module configured to receive a CC mode switching command and switch the CC mode after determining that the switched CC mode is the one corresponding to the CC program signals.

The present disclosure further yet provides a television, including a device for identifying and displaying a CC mode, wherein the device for identifying and displaying a CC mode includes:

a decoding module, configured to decode received CC program signals to obtain decoding information;

an analyzing module, configured to obtain a CC mode corresponding to the CC program signals according to the decoding information; and a displaying module, configured to perform corresponding display according to a preset rule based on the obtained CC mode.

Preferably, the analyzing module is configured to analyze and obtain the CC mode corresponding to the CC program signals according to a field identification bit, a channel identification bit, and a service type identification bit in the decoding information.

Preferably, the preset rule includes corresponding displaying rule when one or multiple types of CC modes are obtained; and the displaying module is configured to:

when one type of CC mode is obtained, generate and display indicating information including the CC mode corresponding to the CC program signals, and display CC contents when a CC mode function control switch in a television menu is detected being open;

when multiple types of CC modes are obtained, generate and display indicating information including the CC modes corresponding to the CC program signals, and display CC contents corresponding to the CC mode having the highest priority according to a priority order of the CC modes when a CC mode function control switch in a television menu is detected being open.

Preferably, the indicating information is displayed by icons or menus.

Preferably, the device for identifying and displaying a CC mode further includes a CC mode switching module configured to receive a CC mode switching command and switch the CC mode after determining that the switched CC mode is the one corresponding to the CC program signals.

By judging the priority of each CC mode, in the present disclosure, the CC mode having the highest priority is chosen according to the priority order to display the CC contents when there exists many CC modes. Therefore, the situation where the CC contents cannot be displayed caused by the existed many CC modes can be avoided. Further, by providing the indicating information, the present disclosure provides correct guidance of mode selection for the user, facilitating the usage of the television.

The realization of the object, features, and advantages of the present disclosure are given in further detail in combination with the embodiments with reference to the accompanying drawings.

DETAILED DESCRIPTION

It should be understood that the embodiments described herein are only used to explain the present disclosure rather than to limit the present disclosure.

Figure 1:
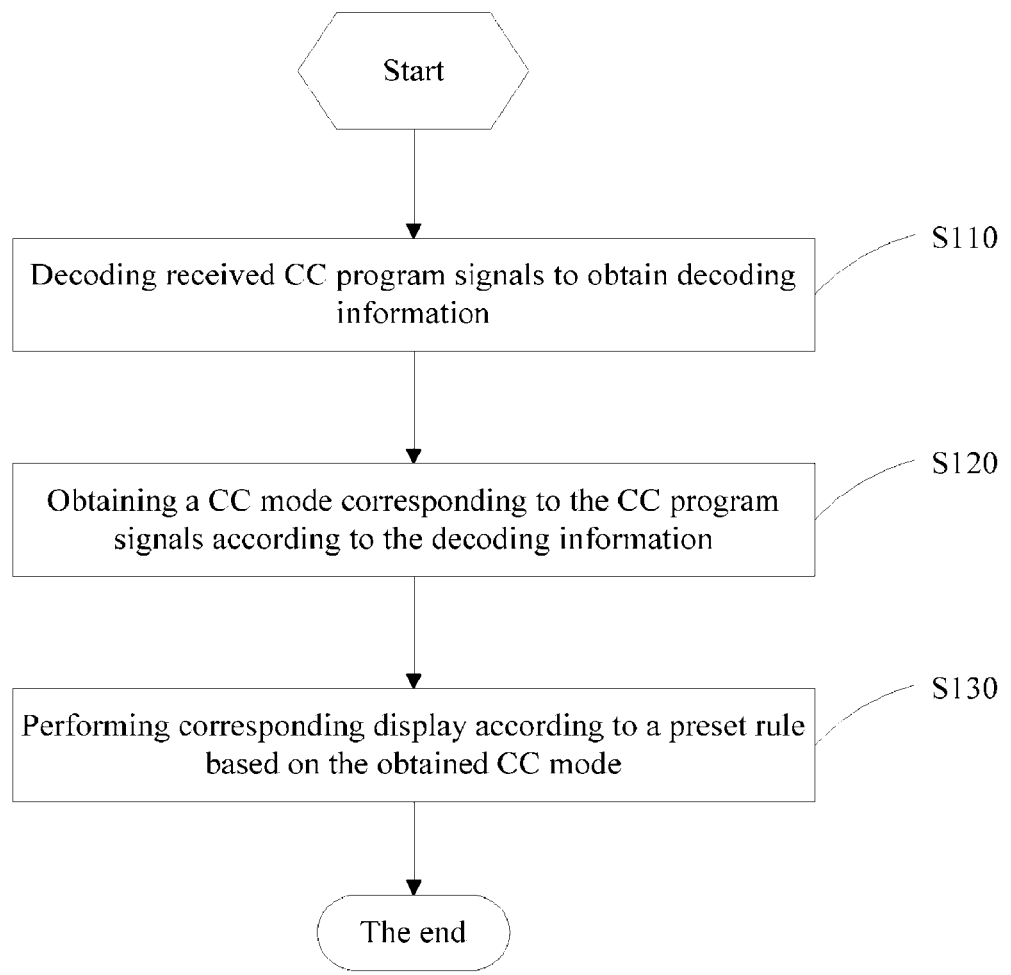
FIG. 1 is a flow chart of a method for identifying and displaying a CC mode of a television in accordance with a first embodiment of the present disclosure.

Referring to FIG. 1, which is a flow chart of a method for identifying and displaying a CC mode of a television in accordance with a first embodiment of the present disclosure. The method of the embodiment includes steps as follows.

Step S110, decoding received CC program signals to obtain decoding information.

When a CC program is chosen by a user, the received CC program signals are decoded to obtain decoding information. In the decoding operation, the CC contents can be decoded by an original decoder provided in the television, or decoded by an individually-set decoder.

Step S120, obtaining a CC mode corresponding to the CC program signals according to the decoding information.

The CC mode corresponding to common CC program signals includes modes from CC1 to CC4 and modes from TX1 to TX4. The former four modes CC1 to CC4 mainly include captions related to the current image of the television: mode CC1 is the main mode, mode CC2 can be the alternative one of mode CC1 and mode CC2 is used when the bandwidth for mode CC1 is insufficient, modes CC1 and CC2 use English, while modes CC3 and CC4 usually use other languages. Compared with the former four modes, the late four modes can include text which is not related to the current image of the television, wherein mode TX1 is the main mode. According to the decoding information obtained in the step S110, the CC mode corresponding to the received CC program signals can be determined.

Step S130, performing corresponding display according to a preset rule based on the obtained CC mode.

In the above step S120, no CC modes may be obtained (that is, no CC contents in the CC program); or, one or multiple types of CC modes may be obtained; thus, corresponding CC contents are displayed according to the situation of the obtained CC mode. Thus, the preset rule is the displaying rule corresponding to the number of the obtained CC mode. For example, when no CC modes are obtained, displaying information informing the user that the CC program does not have CC contents; when one type of CC mode is obtained and a CC mode function control switch is detected being open, displaying the CC contents corresponding to the CC program through the CC mode; when multiple types of CC modes are obtained and the CC mode function control switch is detected being open, displaying all the CC modes (for example, displaying all the CC modes by icons or menus to inform the user of all the CC modes existed in the current program) and displaying the CC contents corresponding to the CC program having the highest priority.

Compared with the existed technology, the embodiment of the present disclosure decodes the CC program signals, identifies the corresponding CC mode according to the decoding information, and displays the CC contents according to the identified CC mode, which simplifies the choosing of the mode and thus is convenient for the user.

The above step S120 includes: analyzing and obtaining the CC mode corresponding to the CC program signals according to a field identification bit, a channel identification bit, and a service type identification bit.

In detail, the decoding information obtained in the step S110 includes the field identification bit, the channel identification bit, and the service type identification bit (type information mentioned below refers to the combination of the filed identification bit, the channel identification bit, and the service type identification bit). By reading each identification bit in the decoding information, the CC mode corresponding to the CC program signals can be determined according to the value of the identification bit. Table one shows examples of detected true values of the CC modes:

| Field identification bit | Channel identification bit | Service type identification bit | Detecting result | Defaulted displaying priority (from low to high) |
|---|---|---|---|---|
| 0 | 0 | 0 | CC1 | ⇧ |
| 0 | 1 | 0 | CC2 | ⇧ |
| 1 | 0 | 0 | CC3 | |
| 1 | 1 | 0 | CC4 | |
| 0 | 0 | 1 | TX1 | |
| 0 | 1 | 1 | TX2 | |

-continued

| Field identification bit | Channel identification bit | Service type identification bit | Detecting result | Defaulted displaying priority (from low to high) |
|---|---|---|---|---|
| 1 | 0 | 1 | TX3 | |
| 1 | 1 | 1 | TX4 | |

Notes:
the values 0 and 1 of the field identification bit respectively indicate a first field and a second field of a frame of image; the values 0 and 1 of the channel identification bit respectively indicate a first channel and a second channel; the values 0 and 1 of the service type identification bit respectively indicate Caption (belonging to the four modes from CC1 to CC4) and Text (belonging to the four modes from TX1 to TX4).

After the field identification bit, the channel identification bit, and the service identification bit are obtained, the CC mode corresponding to the CC program signals can be obtained according to the correspondence shown in Table One.

The above step S130 includes steps as follows.

Step A, when no CC modes are obtained in the step S120, that is, the CC program does not have CC contents, ending the process and indicating that there are no CC contents to be displayed.

Step B, when one type of CC mode is obtained in the step S120, generating and displaying indicating information including the CC mode corresponding to the CC program signals, and displaying the CC contents when the CC mode function control switch is detected being open.

In detail, if the CC mode identified in the step S120 is mode CC1 (that is, the filed identification bit in a group of type information identified from the decoding information is 0, the channel identification bit is 0, and the service type identification bit is 0), generating the indicating information, displaying the corresponding mode CC1 on the screen, and detecting whether the CC mode function control switch in the menu of the television is open. If the switch is open, displaying CC contents according to the displaying manner of the mode CC1 on the screen; if the switch is closed, informing the user that the current CC mode is mode CC1 without displaying any CC content.

Step C, if more than two types of CC mode are obtained in the step S120 (that is, more than two groups of type information are identified from the decoding information), generating and displaying the indicating information including the CC mode corresponding to the CC program signals, and displaying the CC contents of the CC mode having the highest priority according to the priority order of the CC modes (such as the priority order shown in FIG. 1) when the CC mode function control switch in the menu of the television is detected being open.

In detail, if the CC modes identified in the step S120 are CC1, CC2, and TX3, generating the indicating information, displaying the corresponding CC mode on the screen, and detecting whether the CC mode function control switch in the television menu is open. If the switch is open, automatically selecting the CC mode having the highest priority as the current defaulted CC mode according to the priority order of the CC modes, and displaying CC contents according to the defaulted CC mode. As shown in Table One, among the modes CC1, CC2, and TX3, mode CC1 has the highest priority, thus, CC contents are displayed according to the mode CC1. If the switch is not open, prompting the CC modes contained in the current program to the user without displaying any CC content.

In the above steps B and C, the indicating information is displayed by icons or menus. For example, each CC mode corresponds to an icon; when the CC modes obtained in the step S120 are CC2 and CC4, the icons corresponding to the modes CC2 and CC4 are highlighted and are selectable, and the icons corresponding to other CC modes are grayed out and are unselectable.

By judging the priority of each CC mode, in the present disclosure, the CC mode having the highest priority is chosen according to the priority order to display the CC contents when there exists many CC modes. Therefore, the situation where the CC contents cannot be displayed caused by the existed many CC modes can be avoided. Further, by providing the indicating information, the present disclosure provides correct guidance of mode selection for the user, facilitating the usage of the television.

Figure 2:
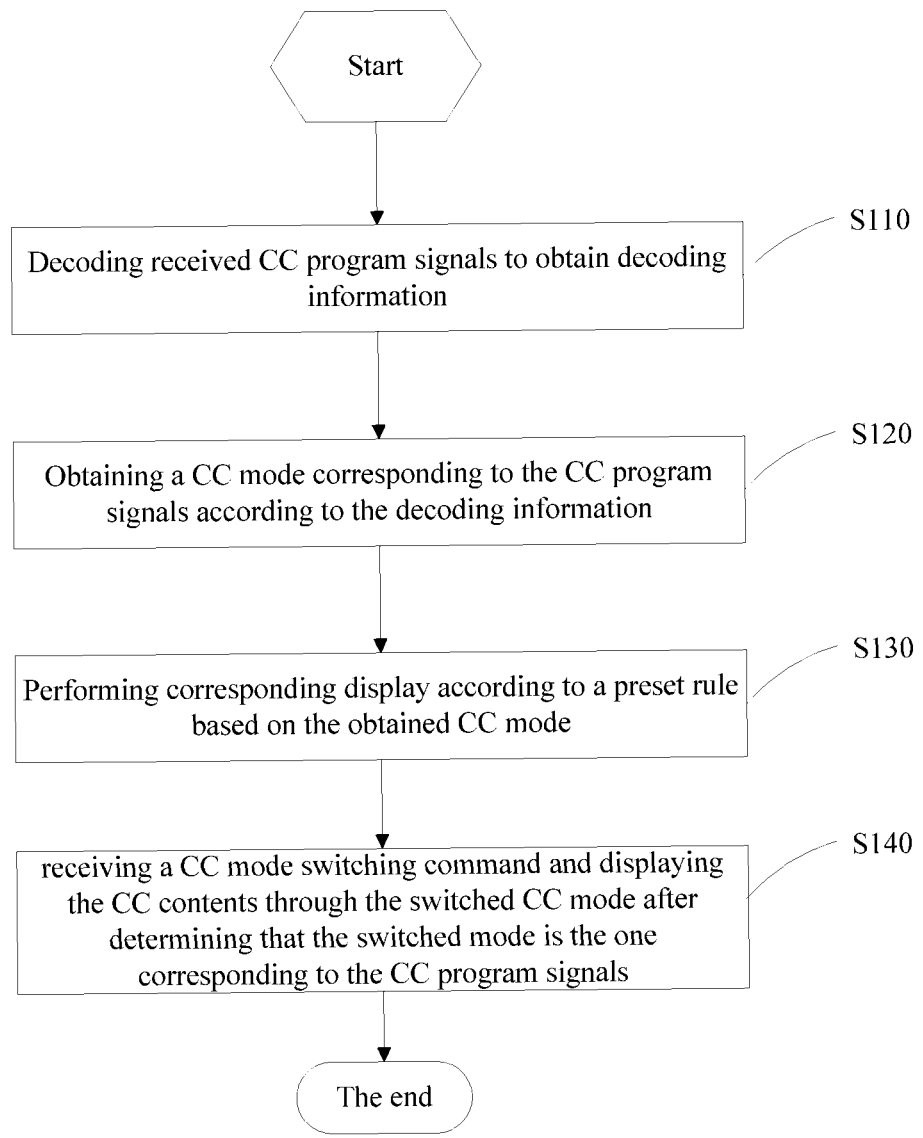
FIG. 2 is a flow chart of a method for identifying and displaying a CC mode of a television in accordance with a second embodiment of the present disclosure.

Referring to FIG. 2, which is a flow chart of a method for identifying and displaying a CC mode of a television in accordance with a second embodiment of the present disclosure. Based on the first embodiment, the method further includes the following step after step S130:

step S140, receiving a CC mode switching command and displaying the CC contents through the switched CC mode after determining that the switched mode is the one corresponding to the CC program signals.

When the user wants to try a different CC mode, the CC mode switching command can be sent to the television. After the CC mode switching command is received, whether the switched CC mode is the one corresponding to the current program signals is judged; if yes, switching the CC mode and displaying the CC contents through the switched CC mode, thereby ensuring the correct selection of the CC mode and further avoiding the improper displaying the CC contents caused by the wrong selection of the CC mode from the user.

Figure 3:
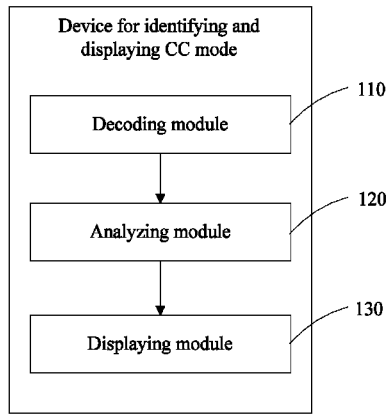
FIG. 3 is a schematic view of a device for identifying and displaying a CC mode of a television in accordance with a first embodiment of the present disclosure.

Referring to FIG. 3, which is a schematic view of a device for identifying and displaying a CC mode of a television in accordance with a first embodiment of the present disclosure. The device includes a decoding module 110, an analyzing module 120, and a displaying module 130.

The decoding module 110 is configured to decode received CC program signals to obtain decoding information.

The analyzing module 120 is configured to obtain a CC mode corresponding to the CC program signals according to the decoding information.

The displaying module 130 is configured to perform corresponding display according to a preset rule based on the obtained CC mode.

When a user selects a CC program, the decoding module 110 at first decodes the received CC program signals to obtain the decoding information. In the decoding operation, the CC contents can be decoded by an original decoder provided in the television, or decoded by an individually-set decoder. The analyzing module 120 is configured to analyze the CC program signals according to a field identification bit, a channel identification bit, and a service type identification bit to obtain the CC mode corresponding to the CC program signals. For the principle for judging the CC mode, please see the detected true values of the CC mode shown in FIG. 1. The analyzing module 120 may obtain no CC modes, or 1 or more types of CC modes; thus, the analyzing module 120 can correspondingly display the CC contents according to the situation of the obtained CC mode.

Compared with the existed technology, the embodiment of the present disclosure decodes the CC program signals, identifies the corresponding CC mode according to the decoding information, and displays the CC contents according to the identified CC mode, which simplifies the step of the choosing of the mode and thus is convenient for the user.

The displaying module 130 is configured to perform the following operations.

A, when the analyzing module 120 obtains no CC modes, that is, the current CC program is not provided with CC contents, the displaying module 130 ends the process and indicating that there are no CC contents to-be-displayed.

B, when the analyzing module 120 obtains one type of CC mode, the displaying module 130 generates and displays indicating information including the CC mode corresponding to the CC program signals, and displays the CC contents when the CC mode function control switch is detected being open.

In detail, if the CC mode identified by the analyzing module 120 is mode CC1, the displaying module 130 generates the indicating information and displays the corresponding mode CC1 on a screen, and detects whether the CC mode function control switch in the menu of the television is open; if yes, the displaying module 130 displays CC contents according to the displaying manner of the mode CC1 on the screen; otherwise, the displaying module 130 informs the user that the current CC mode is mode CC1 without displaying any CC content.

C, when the analyzing module 120 obtains more than two types of CC modes, the displaying module 130 generates and displays indicating information including the CC mode corresponding to the CC program signals, and displays the CC contents of the CC mode having the highest priority according to the priority order of the CC modes (such as the priority order shown in FIG. 1) when the CC mode function control switch in the menu of the television is detected being open.

In detail, if the CC modes identified in the step S120 are modes CC1, CC2, and TX3, the displaying module 130 generates the indicating information, displays the corresponding CC mode on the screen, and detects whether the CC mode function control switch in the television menu is open. If the switch is open, the displaying module 130 automatically selects the CC mode having the highest priority as the current defaulted CC mode according to the priority order of the CC modes, and displays CC contents according to the defaulted CC mode. A shown in Table One, among the modes CC1, CC2, and TX3, the mode CC1 has the highest priority, thus, CC contents are displayed according to the mode CC1. If the switch is not open, the displaying module 130 indicates that the CC modes contained in the current program to the user without displaying any CC content.

The above indicating information is displayed by icons or menus. For example, each CC mode corresponds to an icon, when the CC modes obtained in the step S120 are modes CC2 and CC4, the icons corresponding to the modes CC2 and CC4 are highlighted and are selectable, and the icons corresponding to other CC modes are grayed out and are unselectable.

By judging the priority of each CC mode, in the present disclosure, the CC mode having the highest priority according to the priority order is chosen to display the CC contents when there exist many CC modes. Therefore, the situation where the CC contents cannot be displayed caused by the existed many CC modes can be avoided. Further, by providing indicating information, the present disclosure provides correct guidance of mode selection for a user, facilitating the usage of the television.

Figure 4:
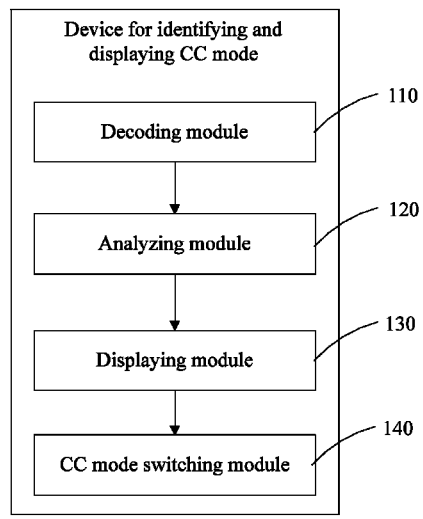
FIG. 4 is a schematic view of a device for identifying and displaying a CC mode of a television in accordance with a second embodiment of the present disclosure.

Referring to FIG. 4, which is a schematic view of a device for identifying and displaying a CC mode of a television in accordance with a second embodiment. Based on the first embodiment, the device further includes a CC mode switching module 140. The CC mode switching module 10 is configured to receive a CC mode switching command and display the CC contents through the switched CC mode after determining that the switched mode is the one corresponding to the CC program signals.

When a user wants to try a different CC mode, the CC mode switching command can be sent to the television. After the CC mode switching command is received, whether the switched CC mode is the one corresponding to the current program signals is judged; if yes, the CC mode switching module 140 switches the CC mode and the CC contents are displayed through the switched CC mode, thereby ensuring the correct selection of the CC mode and further avoiding the improper displaying of the CC contents caused by the wrong selection of the CC mode form the user.

The present disclosure further provides a television having the above device for identifying and displaying a CC mode. For detail structure and working principle of the device, please see the aforementioned description and FIGS. 3 and 4, which is not given in detail herein anymore. Compared with the existed technology, the embodiment of the present disclosure decodes the CC program signals, identifies the corresponding CC mode according to the decoding information, and displays the CC contents according to the identified CC mode, which simplifies the step of the choosing of the mode and thus is convenient for the user.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A method for identifying and displaying a CC mode of a television, comprising:
    decoding received CC program signals to obtain decoding information;
    obtaining a CC mode corresponding to the CC program signals according to the decoding information; and
    performing corresponding display according to a preset rule based on the obtained CC mode;
    wherein obtaining a CC mode corresponding to the CC program signals according to the decoding information comprises:
    analyzing and obtaining the CC mode corresponding to the CC program signals according to a field identification bit, a channel identification bit, and a service type identification bit in the decoding information.

2. The method of claim 1, wherein the preset rule comprises corresponding displaying rule when one or multiple types of CC modes are obtained; and performing corresponding display according to a preset rule based on the obtained CC mode comprises:
    when one type of CC mode is obtained, generating and displaying indicating information including the CC mode corresponding to the CC program signals, and displaying CC contents when a CC mode function control switch in a television menu is detected being open;
    when multiple types of CC modes are obtained, generating and displaying indicating information including the CC modes corresponding to the CC program signals, and displaying CC contents corresponding to the CC mode having the highest priority according to a priority order of the CC modes when a CC mode function control switch in a television menu is detected being open.

3. The method of claim 2, wherein the indicating information is displayed by icons or menus.

4. The method of claim 1 further comprising the following step after performing corresponding display according to a preset rule based on the obtained CC mode:
   receiving a CC mode switching command and displaying the CC contents after determining that the switched CC mode is the one corresponding to the CC program signals.

5. A device for identifying and displaying a CC mode of a television, comprising:
   a decoding module, configured to decode received CC program signals to obtain decoding information;
   an analyzing module, configured to obtain a CC mode corresponding to the CC program signals according to the decoding information; and
   a displaying module, configured to perform corresponding display according to a preset rule based on the obtained CC mode;
   wherein the analyzing module is configured to analyze and obtain the CC mode corresponding to the CC program signals according to a field identification bit, a channel identification bit, and a service type identification bit in the decoding information.

6. The device of claim 5, wherein the preset rule comprises corresponding displaying rule when one or multiple types of CC modes are obtained; and the displaying module is configured to:
   when one type of CC mode is obtained, generate and display indicating information including the CC mode corresponding to the CC program signals, and display CC contents when a CC mode function control switch in a television menu is detected being open;
   when multiple types of CC modes are obtained, generate and display indicating information including the CC modes corresponding to the CC program signals, and display CC contents corresponding to the CC mode having the highest priority according to a priority order of the CC modes when a CC mode function control switch in a television menu is detected being open.

7. The device of claim 6, wherein the indicating information is displayed by icons or menus.

8. The device of claim 5 further comprising a CC mode switching module configured to receive a CC mode switching command and switch the CC mode after determining that the switched CC mode is the one corresponding to the CC program signals.

9. A television, comprising a device for identifying and displaying a CC mode, wherein the device for identifying and displaying a CC mode comprises:
   a decoding module, configured to decode received CC program signals to obtain decoding information;
   an analyzing module, configured to obtain a CC mode corresponding to the CC program signals according to the decoding information; and
   a displaying module, configured to perform corresponding display according to a preset rule based on the obtained CC mode;
   wherein the analyzing module is configured to analyze and obtain the CC mode corresponding to the CC program signals according to a field identification bit, a channel identification bit, and a service type identification bit in the decoding information.

10. The television of claim 9, wherein the preset rule comprises corresponding displaying rule when one or multiple types of CC modes are obtained; and the displaying module is configured to:
    when one type of CC mode is obtained, generate and display indicating information including the CC mode corresponding to the CC program signals, and display CC contents when a CC mode function control switch in a television menu is detected being open; and
    when multiple types of CC modes are obtained, generate and display indicating information including the CC modes corresponding to the CC program signals, and display CC contents corresponding to the CC mode having the highest priority according to a priority order of the CC modes when a CC mode function control switch in a television menu is detected being open.

11. The television of claim 10, wherein the indicating information is displayed by icons or menus.

12. The television of claim 9, wherein the device for identifying and displaying a CC mode further comprises a CC mode switching module configured to receive a CC mode switching command and switch the CC mode after determining that the switched CC mode is the one corresponding to the CC program signals.

* * * * *